(12) United States Patent
Carrier et al.

(10) Patent No.: US 7,417,405 B2
(45) Date of Patent: Aug. 26, 2008

(54) BATTERY MONITORING ARRANGEMENT HAVING AN INTEGRATED CIRCUIT WITH LOGIC CONTROLLER IN A BATTERY PACK

(75) Inventors: David A. Carrier, Aberdeen, MD (US); Dahn T. Trinh, Parkville, MD (US); Geoffrey S. Howard, Columbia, MD (US); Andrew E. Seman, Jr., White Marsh, MD (US); Daniele C. Brotto, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 256 days.

(21) Appl. No.: 11/239,286

(22) Filed: Sep. 30, 2005

(65) Prior Publication Data
US 2006/0071643 A1  Apr. 6, 2006

Related U.S. Application Data

(60) Provisional application No. 60/615,201, filed on Oct. 4, 2004.

(51) Int. Cl.
*H01M 10/46* (2006.01)
(52) U.S. Cl. ..................................... 320/116
(58) Field of Classification Search ................ 320/107, 320/116, 117, 118, 119, 132, 148
See application file for complete search history.

(56) References Cited

U.S. PATENT DOCUMENTS

| | | | | | |
|---|---|---|---|---|---|
| 5,438,250 | A | * | 8/1995 | Retzlaff | 320/128 |
| 5,952,815 | A | * | 9/1999 | Rouillard et al. | 320/116 |
| 6,208,117 | B1 | | 3/2001 | Hibi | 320/134 |
| 6,268,710 | B1 | | 7/2001 | Koga | |

OTHER PUBLICATIONS

International Search Report and Written Opinion dated Mar. 27, 2007.

* cited by examiner

*Primary Examiner*—Edward Tso
(74) *Attorney, Agent, or Firm*—Harness, Dickey & Pierce, P.L.C.

(57) ABSTRACT

A battery monitoring device of a battery pack configured for powering a cordless power tool may include an integrated circuit connected to a microprocessor of the pack that is external to the integrated circuit, and which is connected to each of N battery cells of the pack. The integrated circuit may be configured to take, singly or sequentially, a sampled reading comprising one of an individual cell voltage or a total pack voltage for all cells in the pack. The sampled reading is filtered in the integrated circuit prior to being read by the microprocessor.

17 Claims, 8 Drawing Sheets

BATTERY MONITORING ARRANGEMENT HAVING AN INTEGRATED CIRCUIT WITH LOGIC CONTROLLER IN A BATTERY PACK

CROSS-REFERENCE TO RELATED APPLICATIONS

This application claims priority under 35 U.S.C. §119(e) to U.S. Provisional Patent Application Ser. No. 60/615,201, filed Oct. 4, 2004 to David Carrier et al. and entitled "METHOD, DEVICE AND ARRANGEMENT FOR MONITORING PARAMETERS OF BATTERY CELLS IN A BATTERY PACK", the entire contents of which is hereby incorporated by reference herein.

BACKGROUND OF THE INVENTION

1. Field of the Invention

The present invention generally relates to a method and device for monitoring battery cells of a battery pack configured for powering a cordless power tool, and to a method and arrangement for balancing cell voltages during a charge.

2. Description of Related Art

Cordless products or devices which use rechargeable batteries are prevalent throughout the workplace and home. Rechargeable batteries may be used in numerous devices, from computer products and/or housewares to power tools. Nickel-cadmium, nickel-metal-hydride battery and/or lithium-ion cells may be used in these devices. Since the devices use a plurality of battery cells, the battery cells may be ordinarily packaged as battery packs. These battery packs may be coupled with the cordless devices so as to secure the pack to the device. The battery pack may be removed from the cordless device and charged in a battery charger or charged in the cordless device itself, for example.

SUMMARY OF THE INVENTION

An example embodiment of the present invention is directed to a battery monitoring device of a battery pack configured for powering a cordless power tool. The device may include an integrated circuit connected to a microprocessor of the pack that is external to the integrated circuit, and connected to each of N battery cells of the pack. The integrated circuit may be configured to take, singly or sequentially, a sampled reading comprising one of an individual cell voltage or a total pack voltage for all cells in the pack. The sampled reading is filtered in the integrated circuit prior to being read by the microprocessor.

Another example embodiment of the present invention is directed to a method of monitoring battery cells of a battery pack that is configured for powering a cordless power tool. In the method, a first serial data command may be received from a microprocessor of the pack to take a voltage measurement from channels connected to one or more of the cells. The voltage measurement may be embodied as a differential voltage value measured across an individual cell or a differential voltage value measured across all cells to reflect a total pack voltage. The voltage measurement may be stored in a capacitor and filtered so that the capacitor charges up to an average of the differential voltage value for a given cell or across all cells of the pack. A second serial data command may be received to connect the capacitor to a buffer amplifier so that the microprocessor can read the average voltage value off the capacitor.

Another example embodiment of the present invention is directed to an arrangement in a battery pack for balancing cell voltages during charging of a plurality of cells of the pack. The arrangement may include a microprocessor and an integrated circuit in operative communication with the microprocessor and connected to each of the cells. The microprocessor may direct the integrated circuit to periodically measure, throughout the duration of charging, the cell voltage across each cell of the pack and the total pack voltage in a sequential manner. The integrated circuit communicates the measured individual cell voltage and a current average cell voltage for all cells to the microprocessor. The measured total pack voltage is automatically divided by the number of cells within the integrated circuit to determine the current average cell voltage. The microprocessor controls balancing of each of the cell voltages during the charge based on each measured individual cell voltage and the determined current average cell voltage.

Another example embodiment of the present invention is directed to a method of adaptively balancing cell voltages of a plurality of cells in a battery pack during charging of the battery pack. The method includes continuously monitoring cell voltages for each cell in the pack in a sequential manner, and detecting a voltage differential for one or more cells. The voltage differential may be represented as the difference a given measure cell voltage exceeds a current average cell voltage value calculated from the continuously monitoring step. Cell voltages may be balanced during the charge by discharging those cells having a detected voltage differential, until a measured cell voltage for the discharging cell has dropped to equal the average cell voltage.

Another example embodiment of the present invention is directed to a battery pack configured to monitor voltages of cells therein, the battery pack operatively attachable to a cordless power tool. The battery pack includes a microprocessor and an integrated circuit in operative communication with the microprocessor for monitoring cell voltages of at least N individual cells and total pack voltage during discharge of the pack, based on commands received from the microprocessor. The battery pack includes a motor control semiconductor device operatively controlled by the microprocessor. As the battery pack is engaged to a cordless power tool, and upon an initial actuation of a trigger of the power tool, the microprocessor directs the integrated circuit to sequentially measure the individual cell voltages of all the cells. The microprocessor may energize the motor control semiconductor device to enable battery current to flow to a motor of the power tool, if the determined individual cell voltages are acceptable as compared to a given voltage threshold.

BRIEF DESCRIPTION OF THE DRAWINGS

The example embodiments of the present invention will become more fully understood from the detailed description given herein below and the accompanying drawings, wherein like elements are represented by like reference numerals, which are given by way of illustration only and thus are not limitative of the example embodiments of the present invention.

DETAILED DESCRIPTION OF THE EXAMPLE EMBODIMENTS

Figure 1:
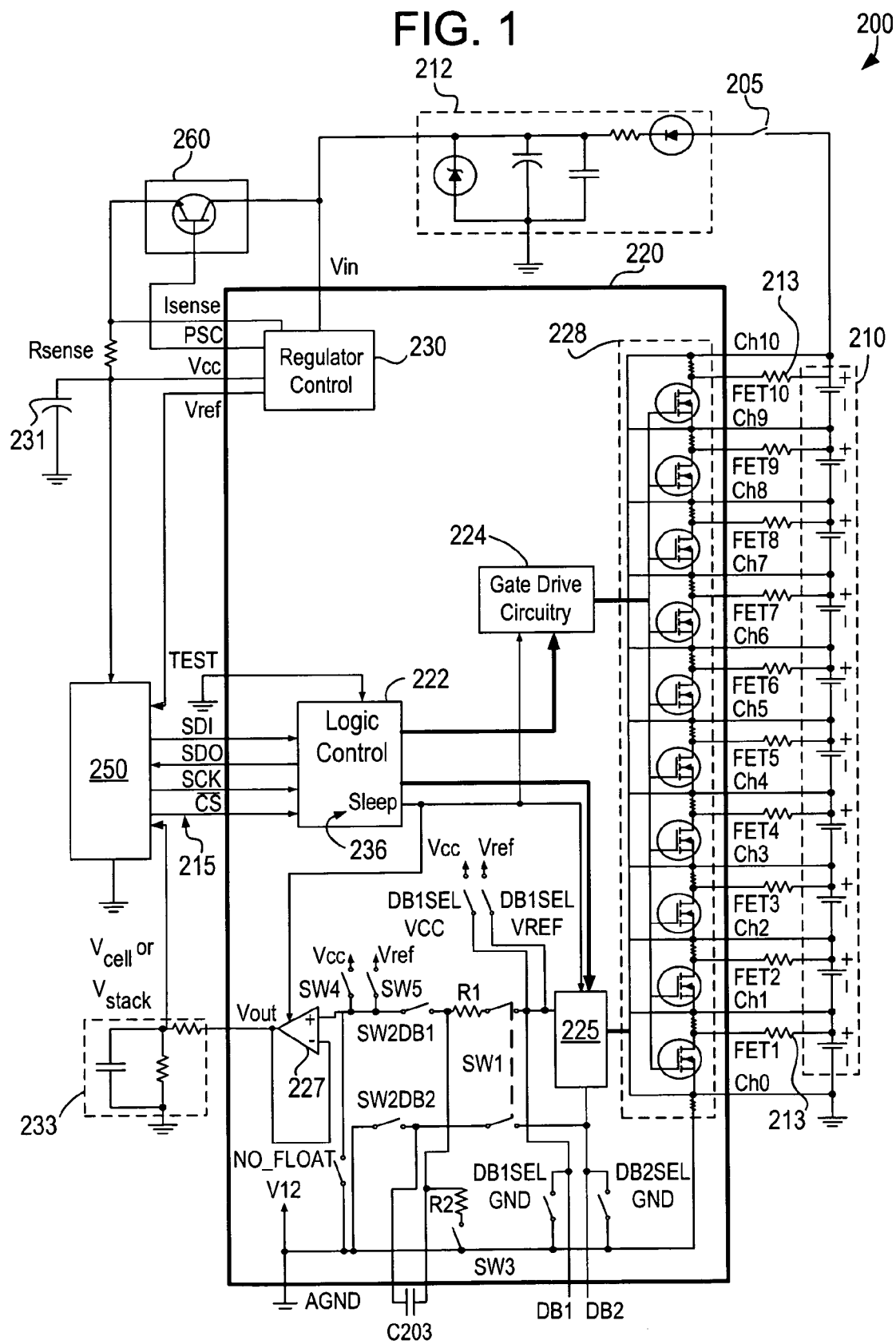
FIG. 1 illustrates a block diagram of a arrangement for monitory battery parameters in accordance with an example embodiment of the present invention.

FIG. 1 illustrates a block diagram of an arrangement for monitoring battery parameters in accordance with an example embodiment of the present invention. The battery monitoring arrangement 200 in FIG. 1 may be configured for sensing certain battery parameters of a battery pack, such as individual cell voltages and/or total stack voltage of the pack.

The battery monitoring arrangement 200 may be part of a removable power source adapted to power a system of cordless power tools. Example cordless power tools may include a circular power saw 10 (FIG. 6), a reciprocating saw 20 (FIG. 7) and a drill 30 (FIG. 8). The tools 10, 20 and 30 each may include a conventional DC motor (not shown) adapted to be powered by a power source having a given nominal voltage rating. In the example embodiments, the tools 10, 20 and 30 may be driven by a removable power source having a nominal voltage rating of at least 18 volts. It will become evident to those skilled that the present invention is not limited to the particular types of tools shown in the drawings nor to specific voltages recited as examples below. In this regard, the teachings of the present invention may be applicable to virtually any type of cordless power tool and any supply voltage.

The removable power source may be embodied as a battery pack 40 having a housing which includes battery monitoring arrangement 200 therein for monitoring battery parameters. The battery pack may be a rechargeable battery pack 40. Battery pack 40 may include a plurality of battery cells within its housing that are connected in series, and/or a plurality of serially-connected strings of cells, in which the strings are in parallel with one another.

For purposes of describing the example embodiments, battery pack 40 may be composed of a plurality of cells having a lithium-ion cell chemistry. As the example embodiments are directed to a battery monitoring arrangement 200 for use in a cordless power tool environment, which requires power sources with much higher voltage ratings than conventional low voltage devices using Li-ion battery technology, (such as laptop computers and cellular phones) the nominal voltage rating of the battery pack 40 may be at least 18V.

However, battery pack 40 may be composed of cells of another lithium-based chemistry, such as lithium metal or lithium polymer, or other chemistry such as nickel cadmium (NiCd), nickel metal hydride (NiMH) and lead-acid, for example, in terms of the chemistry makeup of individual cells, electrodes and electrolyte of the pack 40.

Referring now to FIG. 1, the arrangement 200 may be part of battery pack 40 and includes a battery monitoring device 220. Device 220, which in FIG. 1 is shown as a single integrated circuit (IC) 220, interfaces and/or is in operative communication with a pack controller 250 within the housing of battery pack 40, and a stack 210 of up to N battery cells. The pack controller may be referred to hereafter as a digital microprocessor 250. In an example, N may be at least 5 cells, with stack 210 being comprised of a number of cells in a range of about 5 to 20 battery cells. In other examples, the stack 210 may be embodied by a seven (7) cell configuration, a fourteen (14) cell configuration and/or the illustrative ten (10) cell configuration shown in FIG. 1. In each of the previous examples, the battery pack 40 may be capable of providing an output voltage to its attached cordless power tool in a range of about 18-40 volts. In an additional example, the battery pack 40 may be configured within a range of 7-14 cells to realize a pack voltage between about 25 to 36 volts. These voltages and cell counts for pack 40 are merely exemplary, the present invention is not so limited to the above cell configuration and/or voltage ratings.

As will be explained hereafter, by using digital communications, such as three-wire serial communication, for example, the microprocessor 250 may send and receive commands to and from IC 220. As will be explained in further detail below, IC 220 may be directed, via one or more serial data commands sent over serial data lines 215 by microprocessor 250, to sequentially sample channels corresponding to the battery cells of stack 210 and to level shift each of the sampled readings to a buffered output at buffer amp 227 to the microprocessor 250 via an A/D pin so as to measure the sampled reading. As will be seen below, IC 220 is also capable of discharging individual or multiple cells through internal balancing semiconductor devices, as commanded by the microprocessor 250.

Figure 6:
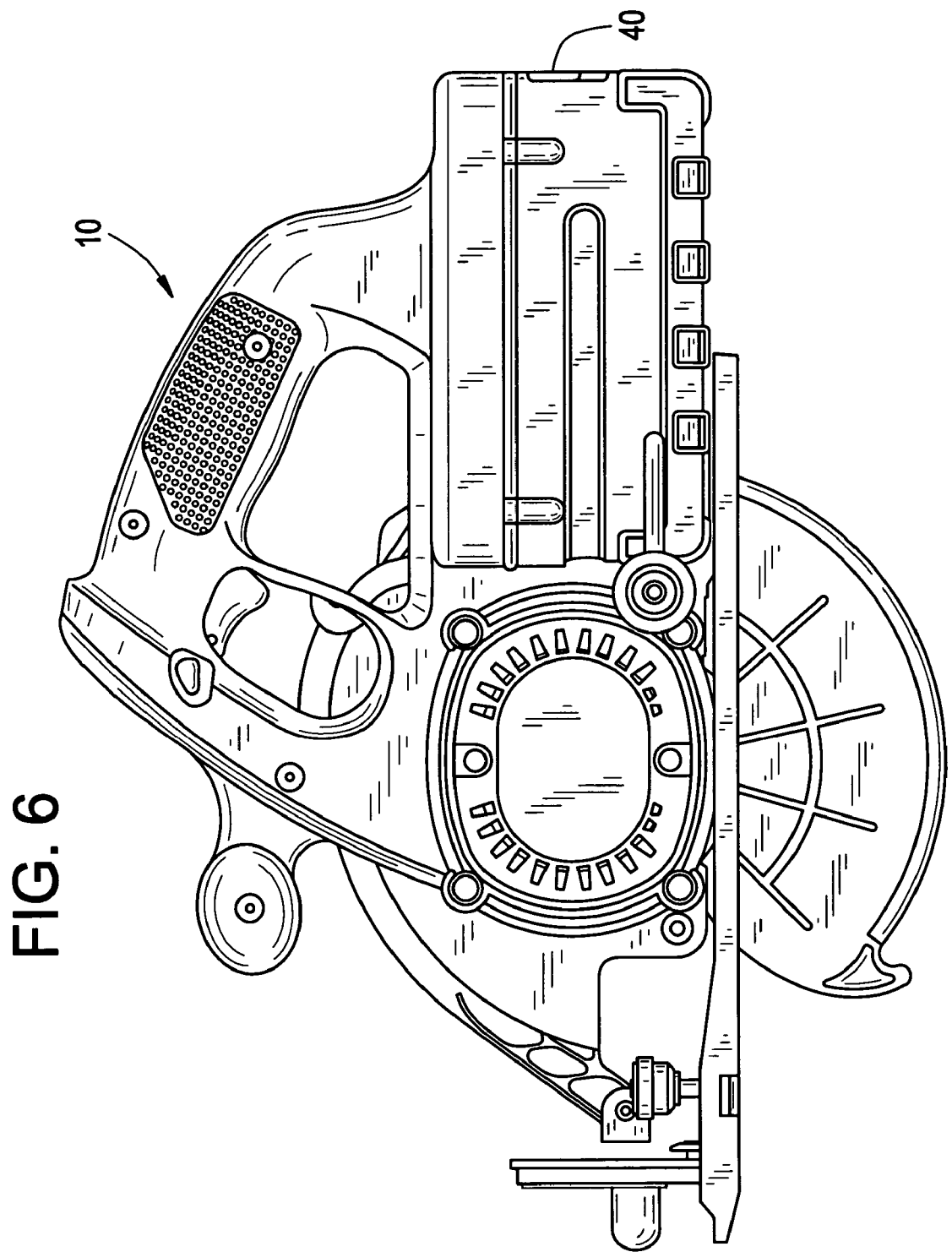
FIGS. 6-8 illustrate example cordless power tools configured to be powered from the example battery pack in accordance with the present invention.
Figure 7:
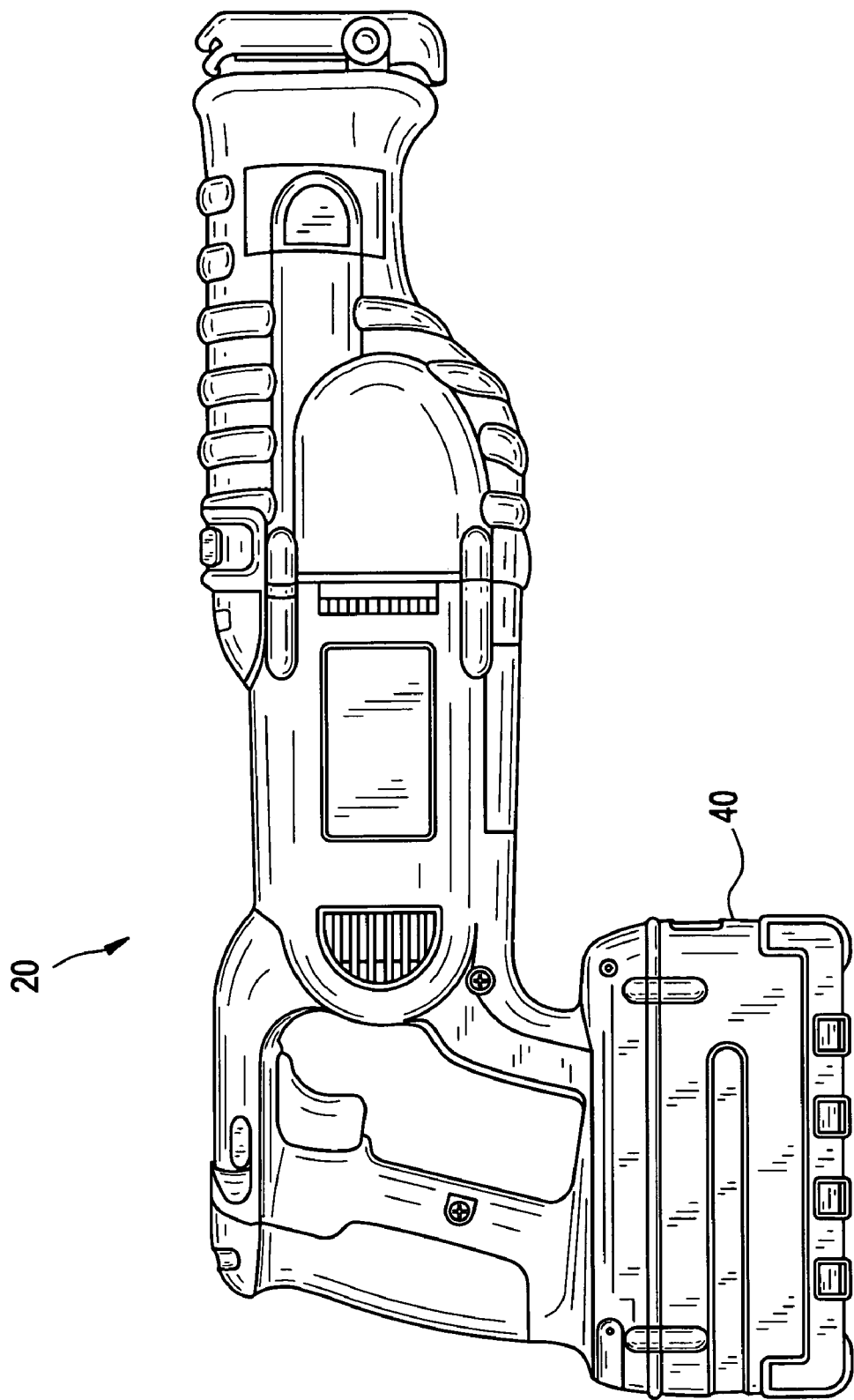
Figure 8:
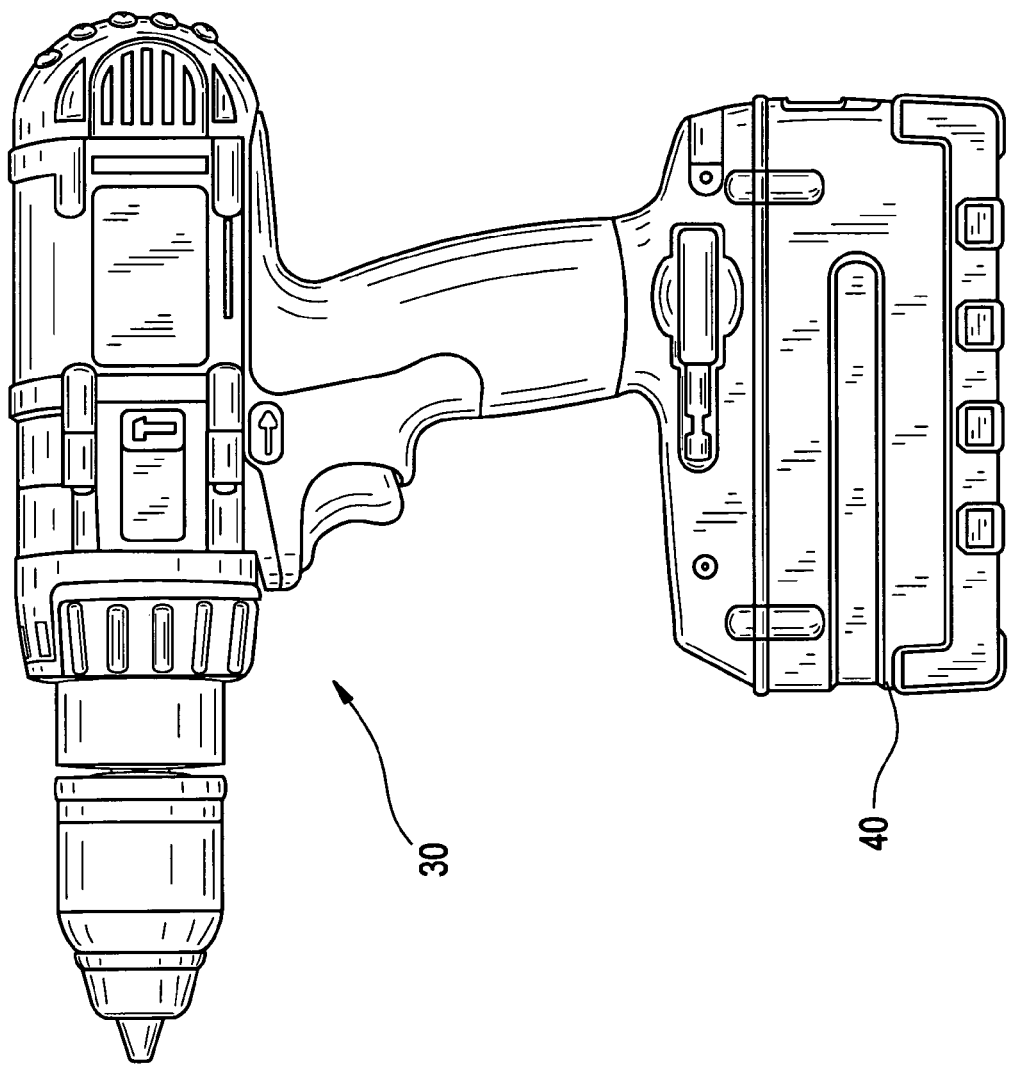

In FIG. 1, the block diagram of arrangement 200 may represent only a portion of the internal circuit makeup of the battery pack 40 shown in any of FIGS. 6-8. The battery pack 40 may include additional functionality or components such as other microprocessors or controllers, a current sensor, a pack temperature sensor, pack identification component(s), current limiting device(s), other protection circuits such as fuses and/or other internal components for example, which are not shown herein for reasons of clarity.

Although in FIG. 1, IC 220 is shown as a single application specific integrated circuit (ASIC), the battery monitoring device may be further embodied in hardware or software as a digital microcontroller, a microprocessor, an analog circuit, a digital signal processor or by one or more digital ICs such as multiple application specific integrated circuits (ASICs), for example.

The pack controller in FIG. 1 hereafter is described as a digital microprocessor 250, and may be embodied as a Pentium® processor by Intel®. Alternatively, this controller may be configured as an analog circuit, a digital signal processor, and/or embodied as one or more digital ICs such as application specific integrated circuits (ASICs), etc., for example. In the example embodiments and as described hereafter, the microprocessor 250 is external to and not part of IC 220, as microprocessor 250 resides separately within the housing of the battery pack 40, in communication with IC 220 via a series of serial data lines 215.

Each of the example battery cells in stack 210 has a corresponding selectable channel, Ch1 to Ch10. The channels represent pins of the IC 220. For example, Ch0 is an ASIC pin connected to the negative side of its cell (cell 1) on the low side or bottom of battery stack 210, CH1 is the pin connected to the positive side of cell 1 and the negative side of cell 2, etc. The pins labeled FET1 through FET 10 represent pins of corresponding semiconductor devices (field effect transistors FET1 through FET 10) and are connected to the positive sides of cells 1-10. The function of FETs 1-10 will be explained in further detail below. IC 220 is operatively connected to corresponding channels of each cell in the stack 210. Each channel thus may be configured to provide a channel input from its corresponding cell to the IC 220.

Arrangement 200 may include a voltage regulator 230 that supplies an internal control voltage (low voltage Vcc) to the IC 220 and microprocessor 250. For example, when the trigger switch 205 of an attached power tool is closed, the stack 210 of battery cells (or a charger) may supply a given input voltage Vin to the regulator 230, which, in turn, supplies a stepped down internal control voltage Vcc to the IC 220 and microprocessor 250. The Vcc supplied to the IC 220 may be filtered, such as by including filtering circuitry 231. A regulator bypass transistor 260 may be provided to dissipate power, so that power is not dissipated in the regulator 230. The PSC signal from the voltage regulator 230 controls the base current in transistor 260 so that VCC remains in a desired stable range, as is known. The voltage reference (Vref) provided by regulator 230 to microprocessor 250 is a constant Vref for the A/D converter (not shown) in the microprocessor 250.

Accordingly, IC 220 is intended to interface microprocessor 250 and a stack 210 of up to N battery cells. Using three-wire serial communication, for example, the microprocessor 250 may send and receive commands to and from the IC 220. The IC 220 device is connected to the stack 210 of battery cells and has access to each cell voltage. Power for the IC 220 may be supplied from a low voltage Vcc pin and a high voltage Vin pin or Vin power terminal. The Vin power terminal may be separate from the Ch10 terminal. The Vin power terminal may be filtered, such as by including filtering circuitry 212 and thus, may be subject to less intense voltage fluctuations. IC 220 may also receive external Vcc power on the Vcc pin if the PSC pin is left open. By reading the voltage across Rsense, IC 220 can limit the current through the bypass transistor 260. Once Vcc is established, the IC 220 creates a temperature-stabilized Vref for the A/D converter in the microprocessor 250.

Data communication may be embodied via serial transmission using a suitable interface. IC 220 may thus include a logic controller 222 for data communications between the microprocessor 250 and IC 220. As an example, logic controller 222 may be embodied as a Serial Peripheral Interface (SPI) logic controller.

In general, a SPI may be used for a synchronous serial communication between a host processor, such as the microprocessor 250 and peripherals such as the logic controller 222 in the IC 220. The SPI typically is configured with two control lines, chip select (CS) and clock (SCK) and two data lines, serial data in (SDI) and serial data out (SDO). Although only one direction is shown for SDI and SDO pins, both the microprocessor 250 and IC 220 have respective SDI and SDO pins. Data flow thus may be transmitted from the SDO pin of the controller 250 to the SDI pin of the IC 220, and/or from SDO pin of the IC 220 to the SDI pin of the controller 250, as is known. With the CS pin, the corresponding peripheral device is selected. This pin is primarily active-low. In an unselected state, the SDO lines are in a high-impedance state (hi-Z) and therefore inactive. The SCK line is brought to the device (IC 220) whether it is selected or not. The SCK signal serves as synchronization of the data communication.

In general SPI operation, a master device (microprocessor 250) decides with which peripheral device (i.e., IC 220) it wants to communicate. The master device provides the clock signal SCK and determines the state of the chip select (CS) lines, i.e. it activates the slave (IC 220) it wants to communicate with. CS and SCK are therefore outputs. The slave device (such as the IC 220) receives the SCK and CS select from as inputs. This means there is one master, while the number of slaves is only limited by the number of chip selects. If a SPI device is not selected, its data output (SDO) goes into a high-impedance state (hi-Z), so that it does not interfere with currently selected devices.

An SPI device can be a simple shift register up to an independent subsystem. The length of the shift registers may differ from device to device. Normally the shift registers may be 8-Bit or integral multiples of it. There also exist shift registers with an odd number of bits. For example, two cascaded 9-Bit EEPROMs can store 18-Bit data.

Although serial communication between the microprocessor 250 and IC 220 described herein is based on the example SPI logic controller 222, it is evident to those of skill in the art that the arrangement could achieve desirable serial communication between devices using Inter IC ($I^2C$) and/or Universal Asynchronous Receiver/Transmitter (USART) interfaces and/or chip components in place of the SPI logic controller of FIG. 1.

SPI logic controller 222, in addition to being the interface for communications between microprocessor 250 and IC 220, is in operative communication with various additional components of IC 220. For example, SPI logic controller 222 may output control signals (based on commands received from microprocessor 250) to drive gate drive circuitry 224 and/or a switch matrix 225. The component arrangement that comprises gate drive circuitry 224 is known in the art and thus is not described herein for reasons of brevity. In an example, switch matrix 225 may be embodied as an analog multiplexer. The function of the switch matrix 225 is to select given channel(s) for sampling and acquisition of battery pack parameters based on the control signal(s) received from SPI logic controller 222 (which in turn correspond to the given data command received from microprocessor 250).

Based on a received command from microprocessor 250, SPI logic controller 222 may also output control signals to drive the gate drive circuitry 224, so as to switch a given semiconductor device (FET) in semiconductor device stack 228 to either ON or OFF. These FETs may be controlled, via SPI logic controller 222 and gate drive circuitry 224, so as to selectively permit discharge of a given cell (or not), hence FETs 1 to 10 may be occasionally referred to as "balance FETs". Each channel may be connected with a corresponding balance FET in stack 228. The control and operation of the balance FETs in stack 228 will be explained in further detail below.

As another example, based on a received command from microprocessor 250, SPI logic controller 222 may output control signals directing the switch matrix 225 to monitor a battery parameter of a given channel, and/or to sequentially and/or switch from channel to channel over a given duration (or continuously) to monitor certain battery parameters of each the N cells, including total battery stack voltage (e.g., total battery pack voltage). Accordingly, and based on the digital data command received from microprocessor 250, switch matrix 225 may be directed (via control signals from SPI logic controller 222) to select channels for monitoring various battery parameters, including, but not limited to: cell voltage of a selected individual cell, total pack voltage (i.e. total battery stack voltage), internal or external voltage references, pack temperatures, and/or monitoring a ground to ground connection for error correction, etc.

In general, and based on the command received, the switch matrix 225 selects designated channels to sample the battery parameter of interest. Although sample and acquisition processes will be explained in more detail below, in general, the sampled reading or parameter of the cell being sampled (in this example a cell voltage value) is first stored as an average voltage value onto an external capacitor, shown as C203 in FIG. 1. The capacitor 203 is external to IC 220 to allow the circuit designer flexibility in sizing the filter frequency. The output of switch matrix 225 (which is a differential voltage value measured from two channels, one on either side of the given cell of interest as shown in FIG. 1 or Table 1) is digitally filtered through an RC filtering circuit formed by capacitor C203 and internal resistor R1 in FIG. 1, as capacitor C203 is being charged.

The filtering desirably removes high frequency noise (which may be due to the discharge of the battery pack, or from the switch matrix 225). Due to filtering, the signal being stored as C203 charges up is an average voltage value across the cell of interest (e.g., the average of the differential cell voltage taken from the two channels bracketing the cell). This may provide a more accurate measurement to the microprocessor 250's A/D converter, for example.

Thus, with filtering provided by the RC filtering circuit (R1 and C203), C203 charges up to the average voltage across the cell. After a software controlled delay to allow C203 to charge, and based on another data command received from microprocessor 250, the capacitor C203 is disconnected from switch matrix 225 and connected to buffer amp 227. Buffer amp 227 receives the stored average voltage value from C203, an analog voltage signal. Buffer amp 227 is provided so that capacitor C203 does not bleed off while the microprocessor 250 is taking the measurement. The Vout sent (via buffer amp 227) to the A/D converter in the microprocessor 250 is a much cleaner analog signal representation of the measured cell voltage, as compared to what would be present without filtering.

As shown in FIG. 1, the output of the buffer-amp 227, Vout, may be fed through an optional external filter or conditioning circuit 233 to the A/D converter within microprocessor 250 for analog to digital conversion into a digital voltage value. No offset correction to the digital voltage value of Vout is required to be performed in microprocessor 250 in order to detect (measure) an accurate cell voltage. Because C203 is tied to ground via switch SW2DB2, as shown in FIG. 1, the copy of the average voltage of the selected cell on C203 is now ground referenced and ready for reading, as Vout from buffer-amp 227, by the A/D converter in microprocessor 250.

Thus, various 8-bit commands sent by the microprocessor 250 through the SDI line may direct the IC 220 to take a measurement and output the analog measurement value through the Vout pin via a conditioning circuit 233 to the microprocessor 250 digital conversion and detection (measurement). This enables the microprocessor 250 to read any individual cell voltage within the stack 210 without having to perform two or more single-ended measurements and/or a digital subtraction or offset correction to determine (measure) the cell voltage.

Accordingly, to sample a battery pack parameter such as an individual cell voltage, and referring to FIG. 1, a command is sent from the microprocessor 250 to the SPI logic controller 222. SPI logic controller 222 in turn sends control signals to close switch matrix 225 and select the given channel to DB1 and DB2 pins of IC220, and to align switch positions (SHUNT of OPEN) for sampling, e.g., switches SW2DB1, SW2DB2, DB1SELGND and DB1SELGND all have logic low states (=0) or OPEN, and switch SW1=1 (SHUNT) to take the sampled reading as capacitor C203 is charged through resistor R1.

After a software controlled delay (which may be a few milliseconds), the SPI logic controller 222 may receive another command from microprocessor 250 to open switch matrix 225, open switch SW1 and shut each of switches SW2DB1, SW2DB2, DB1SELGND and DB1SELGND (logic high=1). This connects C203 to buffer amp 227 for output as Vout, e.g., an analog average voltage value of the cell, to the microprocessor 250

Other commands may enable and/or disable a given balance FET on a given channel where the intent is to drain a specific current which is set by external resistors 213. As will be shown below in further detail, a command may be sent by microprocessor 250 to direct the IC 220 to read the total stack voltage with an automatic divide by ten on the output of switch matrix 225.

Table 1 provides an example list of 8-bit commands that may be transmitted by microprocessor 250 over the SDI line to the IC 220. Across the top row of Table 1, there is shown the 8-bit command (Data Line), what is selected to the DB1 and DB2 pins of the IC 220, the switch positions for switches SW1, SW2 (DB1 and DB2), SW3, SW4 and SW5, and the action of a given FET in FET stack 228.

TABLE 1

Example Command Structure

| Data Line | DB1 | DB2 | S1 | S2 | S3 | S4 | S5 | FET Action |
|---|---|---|---|---|---|---|---|---|
| 0000 0000 | Gnd | Gnd | Open | Shunt | Open | Open | Open | No Change |
| 0000 0001 | Ch1 | Ch0 | Shunt | Open | Open | Open | Open | No Change |
| 0000 0010 | Ch2 | Ch1 | Shunt | Open | Open | Open | Open | No Change |
| 0000 0011 | Ch3 | Ch2 | Shunt | Open | Open | Open | Open | No Change |
| 0000 0100 | Ch4 | Ch3 | Shunt | Open | Open | Open | Open | No Change |
| 0000 0101 | Ch5 | Ch4 | Shunt | Open | Open | Open | Open | No Change |
| 0000 0110 | Ch6 | Ch5 | Shunt | Open | Open | Open | Open | No Change |
| 0000 0111 | Ch7 | Ch6 | Shunt | Open | Open | Open | Open | No Change |
| 0000 1000 | Ch8 | Ch7 | Shunt | Open | Open | Open | Open | No Change |
| 0000 1001 | Ch9 | Ch8 | Shunt | Open | Open | Open | Open | No Change |
| 0000 1010 | Ch10 | Ch9 | Shunt | Open | Open | Open | Open | No Change |
| 0000 1011 | Vcc | Gnd | Open | Open | Open | Open | Open | No Change |
| 0000 1100 | Vref | Gnd | Open | Open | Open | Open | Open | No Change |
| 0000 1101 | Gnd | Gnd | Open | Open | Open | Shunt | Open | No Change |
| 0000 1110 | Gnd | Gnd | Open | Open | Open | Open | Shunt | No Change |
| 0000 1111 | Ch10 | Ch0 | Shunt | Shunt | Shunt | Open | Open | No Change |
| 0010 0001 | Ch1 | Ch0 | Shunt | Open | Open | Open | Open | FET 1 On |
| 0010 0010 | Ch2 | Ch1 | Shunt | Open | Open | Open | Open | FET 2 On |
| 0010 0011 | Ch3 | Ch2 | Shunt | Open | Open | Open | Open | FET 3 On |

TABLE 1-continued

Example Command Structure

| Data Line | DB1 | DB2 | S1 | S2 | S3 | S4 | S5 | FET Action |
|---|---|---|---|---|---|---|---|---|
| 0010 0100 | Ch4 | Ch3 | Shunt | Open | Open | Open | Open | FET 4 On |
| 0010 0101 | Ch5 | Ch4 | Shunt | Open | Open | Open | Open | FET 5 On |
| 0010 0110 | Ch6 | Ch5 | Shunt | Open | Open | Open | Open | FET 6 On |
| 0010 0111 | Ch7 | Ch6 | Shunt | Open | Open | Open | Open | FET 7 On |
| 0010 1000 | Ch8 | Ch7 | Shunt | Open | Open | Open | Open | FET 8 On |
| 0010 1001 | Ch9 | Ch8 | Shunt | Open | Open | Open | Open | FET 9 On |
| 0010 1010 | Ch10 | Ch9 | Shunt | Open | Open | Open | Open | FET 10 On |
| 0010 1111 | Ch10 | Ch0 | Shunt | Shunt | Shunt | Open | Open | All FETs On |
| 0011 0001 | Ch1 | Ch0 | Shunt | Open | Open | Open | Open | FET 1 Off |
| 0011 0010 | Ch2 | Ch1 | Shunt | Open | Open | Open | Open | FET 2 Off |
| 0011 0011 | Ch3 | Ch2 | Shunt | Open | Open | Open | Open | FET 3 Off |
| 0011 0100 | Ch4 | Ch3 | Shunt | Open | Open | Open | Open | FET 4 Off |
| 0011 0101 | Ch5 | Ch4 | Shunt | Open | Open | Open | Open | FET 5 Off |
| 0011 0110 | Ch6 | Ch5 | Shunt | Open | Open | Open | Open | FET 6 Off |
| 0011 0111 | Ch7 | Ch6 | Shunt | Open | Open | Open | Open | FET 7 Off |
| 0011 1000 | Ch8 | Ch7 | Shunt | Open | Open | Open | Open | FET 8 Off |
| 0011 1001 | Ch9 | Ch8 | Shunt | Open | Open | Open | Open | FET 9 Off |
| 0011 1010 | Ch10 | Ch9 | Shunt | Open | Open | Open | Open | FET 10 Off |
| 0011 1011 | "Wake up" | | Shunt | Shunt | Open | Open | Open | All FETs Off |
| 0011 1110 | Sleep Mode | | Open | Open | Open | Open | Open | All FETs Off |
| 0011 1111 | Ch10 | Ch0 | Shunt | Shunt | Shunt | Open | Open | All FETs Off |

As shown in FIG. 1, there is provided an auxiliary circuit (consisting of switches DB1SELVcc, DB1SELVref, DB1SELGND and DB2SELGND) for an external device that is connectable to pins DB1 and DB2. In an example, the external device may be a high voltage differential amplifier, which could be added to replace the switch-capacitor arrangement of switches SW1-SW5 and C203 (e.g., switch-capacitor arrangement) in IC 220, or to provide a back-up battery monitoring means if the switch-capacitor arrangement fails. Accordingly, the external differential amplifier would be connected to the output of the switch matrix 225 to provide differential voltage measurements from the directly to the A/D converter of the micro 250?, clarify].

By using command "0000 1101" and reading the voltage on Vout, the microprocessor 250 can determine whether or not the external amplifier is connected to DB1 and DB2. In an example, if an external device is used, the voltage reading will be ground potential (GND). If the IC 220 is used, then the voltage reading will be 5 volts. If the external amplifier is used, the command "0000 0000" is not used for acquisition.

Individual Cell Voltage Measurements

Referring to Table 1, and in an example, assume a command "0000 0111" is sent from the microprocessor 250 to the IC 220, which is a command for measuring the cell voltage of cell 6 between channels Ch6 and Ch7. As can be seen from Table 1, this command made no changes to the status of any of the balance FETs in stack 228. The command is processed by SPI logic controller 222 and returned back to the microprocessor 250 during the next byte transfer on the SDO line for verification. This is because immediately following the original command, the microprocessor 250 continues to toggle the SCK line, while the logic controller 222 sends the original command back for verification.

Once read, the SPI logic controller 222 controls the switch matrix 225 to select Ch7 to the DB1 pin and to select Ch6 to the DB2 pin, so as to sample a differential voltage representative of the cell voltage at cell 6. At the same time, SW1 closes to start charging capacitor C203 across pins DB1 and DB2, via the RC network formed by R1 and C203. Accordingly, due to the filtering of the RC network, capacitor C203 stores an average of the differential voltage for cell 6, rather than the immediate differential voltage for cell 6 which could fluctuate wildly as charge/discharge currents change.

After a software controlled delay, the microprocessor sends a second command 0000 0000. As shown in Table 1, this command opens switch matrix 225 and switch SW1 and shuts each of switches SW2DB1, SW2DB2, DB1SELGND and DB1SELGND (logic high=1). This connects C203 to buffer amp 227 to feed Vout to the microprocessor 250's A/D converter. The remaining cells of stack 210 can be read the same way.

Total Stack Voltage Measurement

A command may be used by microprocessor to read total stack voltage. To measure total stack voltage, microprocessor 250 sends the command "0000 1111" to the IC 220, which is a command for measuring the total stack voltage between CH0 and Ch10. The command is processed by SPI logic controller 222 and returned back to the microprocessor 250 during the next byte transfer on the SDO line for verification. As shown in Table 1 and with reference to FIG. 1, the SPI logic controller 222 controls the switch matrix 225 to select Ch10 to the DB1 pin and to select Ch0 to the DB2 pin, so as to sample a differential voltage representing the total stack voltage of the battery pack. At the same time, switches SW1, SW2 and SW3 close to start charging capacitor C203 across pins DB1 and DB2, through a voltage divider circuit formed by R1 and R2 that charges capacitor to the average voltage of the stack at a 10:1 ratio. The 10:1 ratio is thus set by the values of R1 and R2.

The voltage value being stored on capacitor C203 is filtered through the RC network formed by R1 and C203 to obtain an average voltage value of the total stack voltage. After a software controlled delay, the microprocessor 250 may send command 0000 0000 to connect C203 to buffer amp 227 to feed Vout to the microprocessor 250's A/D converter. However, since switch SW2 is shut during sample and acquisition of total stack voltage, the microprocessor 250's A/D can continuously measure total stack voltage.

The switch matrix 225 can change to any channel from any other channel without shorting the cell voltages, which ordinarily may cause a shoot-through condition. Shoot-through is a condition that normally occurs during a transition of a switch from one connection to another. If a switch were to make contact with one branch of a circuit before breaking contact with a second branch, current could flow from the first branch to the second branch. This is an undesirable condition and thus most switches are designed with a "break before make" contact system. The output of the switch matrix 225 is thus filtered by the RC circuit before entering the buffer-amp 227.

In FIG. 1, the CS pin is the Chip Select. When pulled low, the SPI logic controller 222 will function normally. When pulled high, the SPI logic controller 222 send and receive logic is reset. This function is useful for packet/byte synchronization to keep the IC 220 bit counter synchronous with the master clock. The SDO pin may be set to tri-state during this reset, as is known.

IC 220 may include a SLEEP pin, shown generally at 236. Referring to FIG. 1 and Table 1, a SLEEP command 0011 1110, when given, will cause IC 220 to be switched into a low-power sleep mode. Thus, as the SLEEP pin 236 is pulled low, the IC 220 is switched into a low-power sleep mode. All FET's in stack 228 are disabled and the $V_{out}$ is disabled and switched to a high Z state. SPI logic of logic controller 222 is also disabled during sleep mode and the SDO pin is set to tri-state.

Also in table 1, a specific "wakeup" command 0011 1011 is provided to bring IC220 out of the sleep mode. When coming out of sleep mode, the SPI logic is reset regardless of the status of the CS pin. The balance FETs in stack 228 are also reset to the "OFF" state upon awakening.

Figure 2:
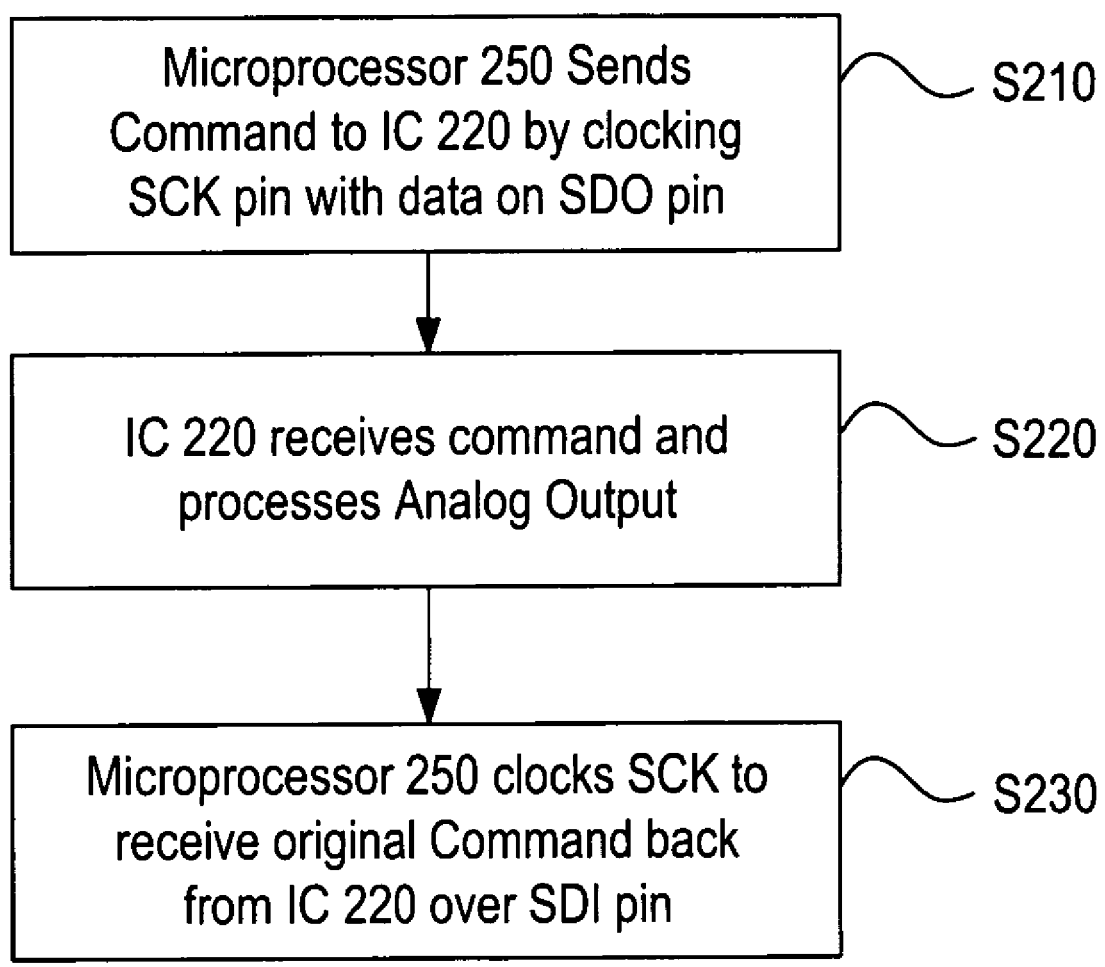
FIG. 2 is a flow diagram illustrating data flow between the microcontroller and ASIC of FIG. 1, in accordance with an example embodiment of the present invention.

FIG. 2 is a flow diagram illustrating general data flow between the microprocessor 250 and IC 220 of FIG. 1, in accordance with an example embodiment of the present invention. In general, microprocessor 250 sends a command (S210) to IC 220 by clocking the SCK pin and sending the 8-bit data command on its SDO pin, to be received by the SDI pin of the IC 220. The IC 220 receives the command (S220) and processes the analog output. The microprocessor 250 then clocks the SCK pin (S230) to receive the original command back from the IC 220 over the microprocessor 250's SDI pin, for verification to the microprocessor 250 that the IC 220 understood and implemented the correct command.

If the responding command is different from the original command, the microprocessor 250's A/D reading (detected or measured value received from IC 220) is discarded and the original command can be resent. This two byte transfer may be considered excessive for use in electrically quiet, noise-free environments. In that case, a standard SPI protocol may be used where hand-shaking is done bit-by-bit instead of byte-by-byte. Hand-shaking may be defined as the act of receiving a signal and transmitting it back to the originator for verification.

Figure 3:
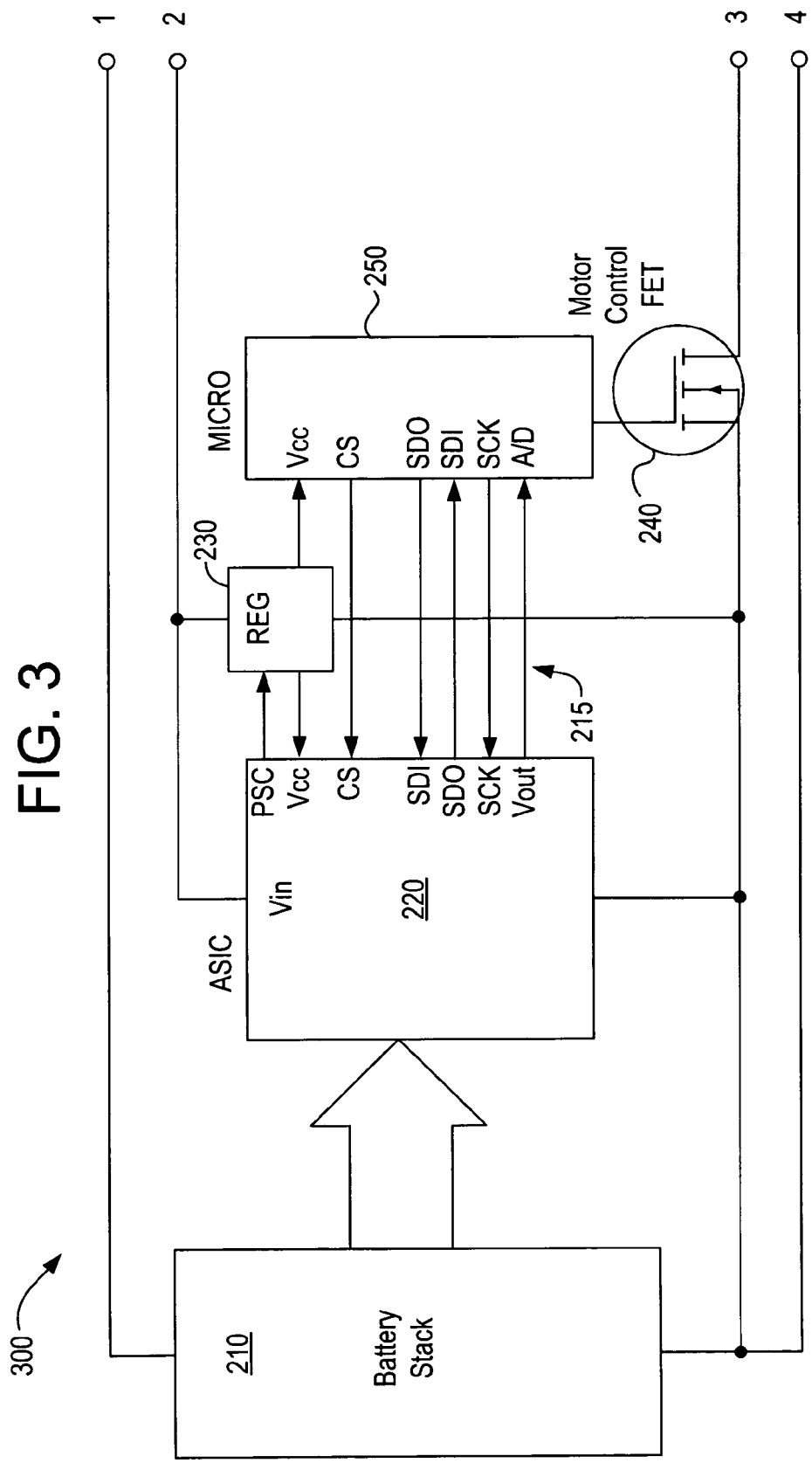
FIG. 3 is a block diagram illustrating components and terminals of an example battery pack in accordance with an example embodiment of the present invention.
Figure 4:
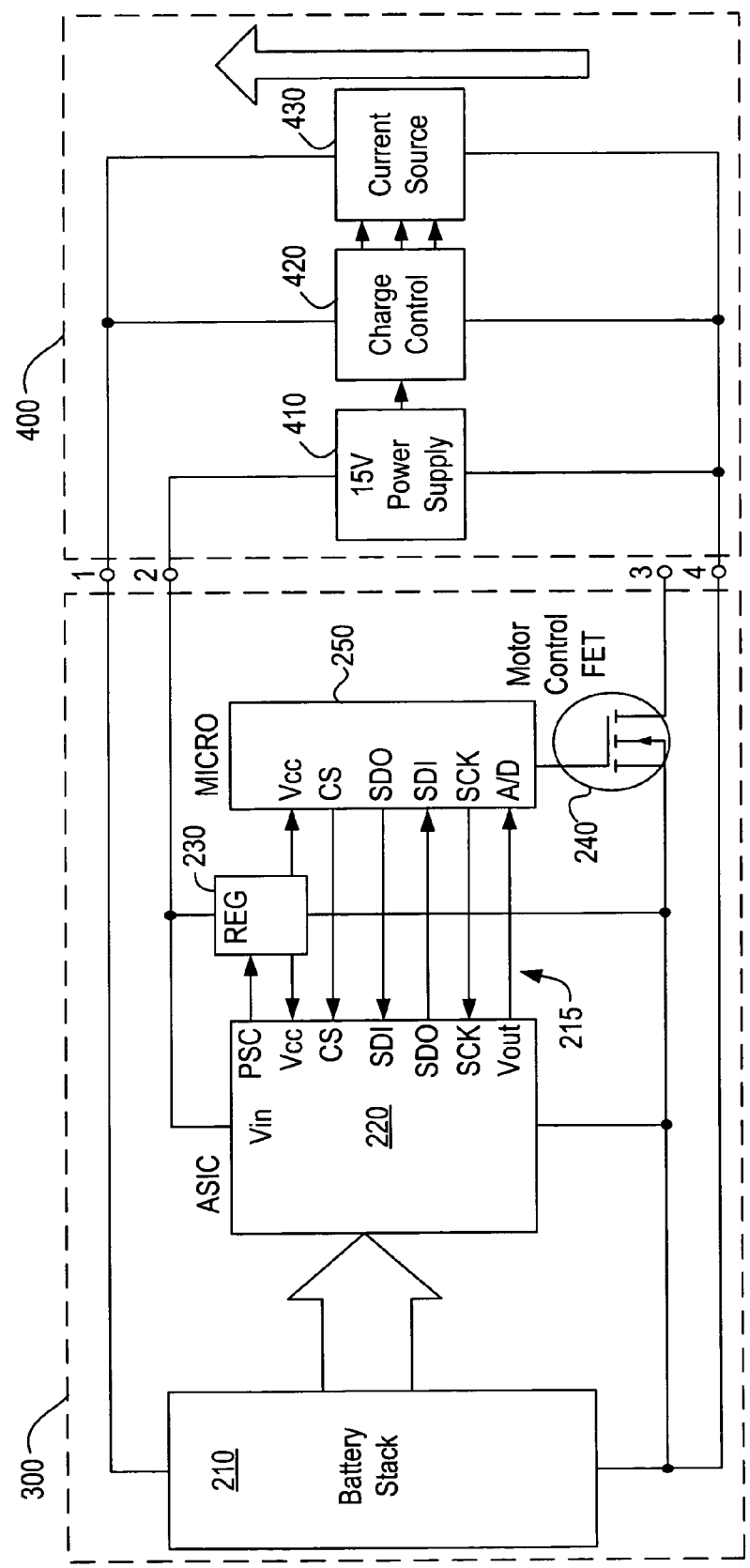
FIG. 4 is a block diagram illustrating components and connection between an example battery pack and an example battery charger in accordance with an example embodiment of the present invention.

FIG. 3 is a block diagram illustrating components and terminals of an example battery pack in accordance with an example embodiment of the present invention; and FIG. 4 is a block diagram illustrating components and connection between an example battery pack and an example battery charger in accordance with an example embodiment of the present invention.

As an implementation example, the arrangement 200 of FIG. 1 is described in the context of a battery pack 300 as shown in FIGS. 3 and 4. The block diagram of battery pack 300 only shows the salient features of arrangement 200 for purposes of clarity. It may be understood that the battery pack 300 could have additional sense components in operative communication with microprocessor 250, for example, such as a current sensor, temperature sensor, pack ID device, current limiting device, etc. Hereafter, example features and functions of the IC 220 during an example charge and discharge cycle are described.

Referring to FIG. 3, battery pack 300 is shown in an inactive state, not connected to any electrical device. In FIG. 3, four terminals (terminals 1-4) are shown. However, the example embodiments should not be limited to this terminal configuration, as greater or fewer terminals could be included, depending on the desired information to be passed between the battery pack 300 and another connectable electrical device such as a power tool or charger.

The cells of battery stack 210 may be completely dead (0 Volts) in this example, with the battery pack 300 sitting idle on a shelf. As shown in FIG. 3, the regulator 230 is not powered, so IC 220 and microprocessor 250 are idle and nothing is live. By placing the battery pack 300 into the charger 400 (FIG. 4), the following events occur:

(i) The charger 400 supplies a source voltage (here shown as an example 15 Volts) to the bypass transistor 260 and the Vin pin, which in turn controls the regulator 230 through the PSC pin.

(ii) The regulator 230, in turn, supplies an example 5 Volts ($V_{CC}$) to the microprocessor 250 and IC 220 (low voltage $V_{cc}$ pins).

(iii) The microprocessor 250 resets and begins initializing its own program parameters. The resets and initialization routines may be similar to that done by a microprocessor of a PC or laptop upon start-up, for example, and are not explained in detail as these procedures are not a focus of the invention.

(iv) After initialization, the microprocessor 250 communicates with the charger 400 (such as with the charge control 420) via serial communications (not shown for clarity).

(v) Microprocessor 250 maintains motor control FET 240 OFF, since microprocessor 250 has determined that battery pack 300 is connected to a charger 400 and not a power tool.

Charge Cycle

Referring to FIG. 4, before charging can commence, the A/D readings (values of cell voltages) should be known. The first cell (cell between channels Ch0 and Ch1 in FIG. 1) may be chosen by microprocessor 250 sending command 0000 0001 to IC 220. The data may be clocked out to IC 220, and after a brief waiting period, a return byte may be clocked back in by the microprocessor 250. The returned byte should match the original command if communication was effective.

While the microprocessor 250 is verifying the returned command, IC220 is putting the first cell's voltage on its DB1 and DB2 pins. The external capacitor C203 is charged through the internal resistor R1. After a software controlled delay, the microprocessor 250 sends a second command 0000 0000 to connect capacitor C203 to buffer amplifier 227 to feed Vout to the microprocessor 250's A/D converter. The remaining cells in stack 210 can be read the same way. With the cell voltages known, the microprocessor 250 in the battery pack 300 may command the charger 400 to begin charging.

Dynamic Cell Balancing During Charge

The cells of stack 210 increase in voltage as they are charged. Not all of the cells have the same capacity, so some of the cell voltages are higher than others. To head off potential overcharge events, the cells may be monitored sequentially and continuously as often as needed by microprocessor 250, in an effort to detect a voltage differential For example, IC 220 may be directed by microprocessor 250 to scan the entire cell stack 210 in about 10 milliseconds, but due to the slow nature of charge, longer cycling times could be employed. In any event, the measuring, evaluating of cell voltages against a threshold and balancing of cells voltages may be repeated throughout the charge as necessary so as to maintain all cell voltages substantially balanced during the charge.

Each cell may thus be sampled by microprocessor 250 via data commands sent to IC 220, with the detected or measured value stored in an associated internal or external memory of microprocessor 250. When a complete scan is taken, for example, the total stack voltage may be taken as an eleventh measurement. This value is scaled or automatically divided by 10 in IC 220 via the voltage divider circuit (R1 and R2), such that capacitor C203 charges to an average cell voltage for all the cells. If all the individual cell voltage measurements are added, the measurements should add up to the average cell voltage times ten. This procedure may be used as an error check on system integrity, for example.

Moreover, the average cell voltage may also be used as a running, relative reference value, or threshold. This threshold may be to determine which individual cells have smaller capacity during the charge and thus are charging faster than the rest. Such smaller capacity cells could pose a problem if left unattended during charge. As an example, and for lithium-ion cells, an overcharge condition is highly undesirable for the cell. In the example of FIG. 1, if nine of the cells are at 4 volts, and the tenth cell is at 4.2 volts (max voltage), the total stack 210 voltage reading is only 40.2 volts. This does not mean it is permissible to continue charging, since the cell at 4.2 volts would be damaged if charging were continued. Accordingly, it is desirable to provide active cell balancing during the charge, so that the voltage of the tenth cell (or sixth cell, fourth cell, etc., for example) never gets any higher in voltage than the average cell voltage value for all cells. This way, all cells in stack 210 reach the peak voltage together.

The microprocessor 250 may thus direct IC 220 to continuously monitor each of the cells in a sequential manner, taking individual and total stack voltage measurements so as to detect any voltage differential between the detected individual cell voltage and the average cell voltage for all cells, which is determined from the automatic division of the total stack voltage by 10. In a particular example, and referring to FIG. 1, the detected voltage of cell number 4 (between Ch3 and Ch4) is slightly higher than the reference value, e.g., the determined average cell voltage for all the cells in stack 210. To speed the balancing of the cells, the microprocessor 250 is able to dynamically detect this voltage differential based on a digital comparison between the stored A/D value for the cell (e.g., the detected cell voltage value for cell 4) from command 0010 0100 in Table 1, and the stored average cell voltage A/D value measured by IC 220 when sampling the total stack voltage, as directed by command 0000 1111).

Arrangement 200 may thus be configured to cycle through all cell voltage measurements in about 10 milliseconds, and then may compare the measured individual cell A/D values to the measured average cell voltage A/D value to dynamically determine "unbalanced" cells. If the microprocessor 250 determines that cell 4 is slightly higher in voltage than the average cell voltage of the cells in stack 210, microprocessor 250 issues a data command 0010 0100 to the IC 220. This command tells the IC 220 to turn the balance FET 4 in semiconductor device stack 228 to the ON-state. The cells are all being charged at the same rate except for cell 4, whose charge rate is lowered by the discharge rate with FET 4 ON. This allows the other cells to "catch up" to cell 4, as the individual cell voltage of cell 4 drops so as to meet the average cell voltage of the stack 210.

So far, determining whether to discharge particular cells during charge in an effort to obtain balanced cell voltages across the pack 300 has be described using the average cell voltage of all cells is stack 210 as a baseline or reference value, (e.g., as a threshold). However, discharging the cell having a maximum differential voltage from the average cell voltage of the stack 210 is only one example threshold. In an alternative, after IC 200 performs each cycle of individual cell voltage measurements under the direction of the data commands from microprocessor 250, microprocessor 250 can issue a command to IC 220 to discharge the highest voltage cell as evident from the individual cell voltage measurements. In another alternative, based on the voltage measurements received in a given (or each) cycle of measurements, microprocessor 250 can issue a command to IC 220 to discharge multiple cells, such as the X highest voltage cell(s), as evident from the individual cell voltage measurements. In a further alternative, microprocessor 250 may issue a special command to IC 220 to discharge those cell(s) whose cell voltage measurement exceeds a given voltage threshold, such as Y multiplied by a minimum voltage for the cell that may be set in advance (Y being an integer $\geq 1$). These methodologies represent other example types of threshold criteria for discharging one or more cells in the pack 300 during a charge, in an effort to balance cell voltages evenly during and upon completion of the charge.

Determining Total Stack Voltage of Cell Stack During Charge

As discussed above, and in addition to monitoring the individual cell voltages, the IC 220 may be commanded to measure the total stack voltage of stack 210 with command 0000 1111. As described earlier, the total stack 210 voltage may be automatically divided by 10 inside IC 220, which provides an average cell voltage value for cells of the stack 210. The individual A/D readings received by the microprocessor 250 should add up to ten times the stack A/D measurement (i.e., the average cell voltage used by the microprocessor 250 to determine voltage differential for each of the cells in stack 210 in a continuous manner) sent as $V_{out}$ to the A/D pin of the microprocessor 250. This function may be done as a back up to the cell checking to prevent overcharge.

Additional Example-Cell Balancing

As time during the charge elapses, one or more additional cells could begin to have a slightly higher voltage than the average cell voltage for the cells. These additional cell(s) may be discharged by the IC 220 concurrently with cell 4, after being commanded to do so by the microprocessor 250. This may be performed as was described for cell 4 above. When scanning the cells that are being discharged, (cell 4 for example), the most accurate measurement for cell 4 can be made with data command 0011 0100. This directs the IC 220 to output the cell 4 voltage, but it also turns off (unlatches) the balance FET for that cell (FET4). With no current being discharged, the voltage of cell 4 is a reasonably sound indicator of its state-of-charge. When finished reading the channel, the balance FET could be turned back on (if deemed necessary) with command 0010 0100.

Later in the charge, cell 4 voltage has dropped back to the average cell voltage of the stack 210. The microprocessor 250 determines this as a trigger to stop discharging cell 4. The same command 0011 0100 may be sent to IC 220 to measure the cell voltage of cell 4 and un-latch the balance FET 4. Now cell 4 can receive the full charge current that is being received by the remaining cells.

Terminating Charge

Eventually, the cells in stack 210 all reach a voltage where it is desirable to terminate the charge current. The microprocessor 250 can make this decision in various ways, which are not discussed here, as such termination strategies are outside the scope of the invention. Microprocessor 250 may communicate with the charger 400 (i.e., by serial data communications) so that the charge current is suspended. In this example, each cell, when fully charged, may have roughly 4.2 volts of charge; thus the voltage at Ch10 is about 42 volts with respect to ground. The Vin pin and regulator 230 are still supplied with the charger 400's 15 volts.

The pack 300 is removed from the charger 400, and may be placed back in a tool-box (or other storage area) to sit for a while. The battery cells in stack 210 still exert their voltage on the IC 220 pins, but because the Vcc pin is not powered and Vin is at zero volts, the IC 220 is shut-down and there is only minimal leakage current drain on the cells.

Discharge Cycle—Battery Pack Operation with Power Tool

Figure 5:
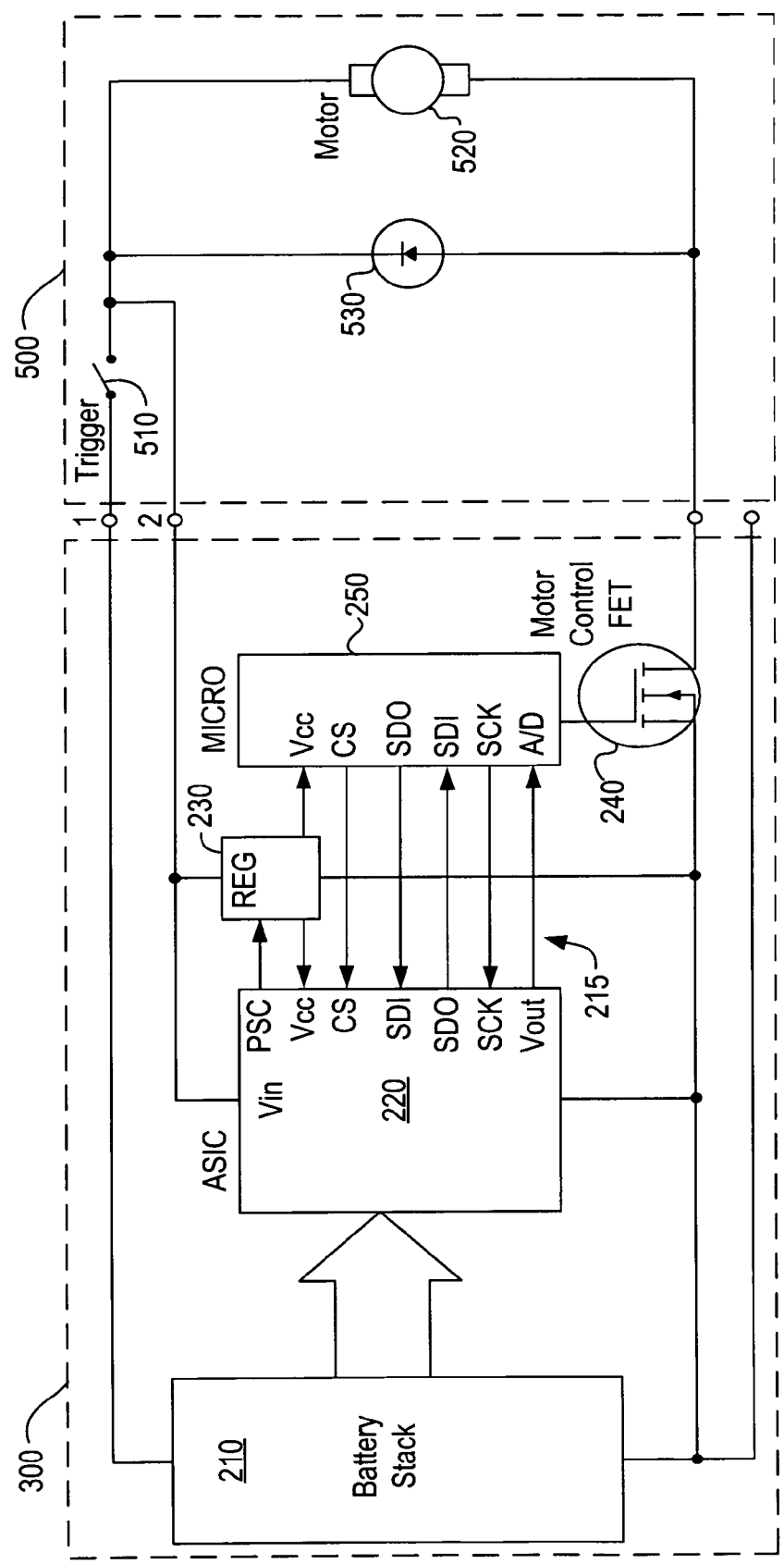
FIG. 5 is a block diagram illustrating components and connections between an example battery pack and an example power tool in accordance with an example embodiment of the present invention.

FIG. 5 is a block diagram illustrating components and connections between an example battery pack and an example power tool in accordance with an example embodiment of the present invention.

In an example, such as when a work day begins, the battery pack 300 may be placed in a tool 500 as shown in FIG. 5. As soon as the tool trigger switch 510 is actuated, the cell stack 210 voltage of the pack 300 may be applied to the regulator 230 and Vin pin of the IC 220. After an initialization period, the microprocessor 250 realizes that it is in a tool (instead of a charger) and checks the cell voltages. If all measurements are acceptable, motor control FET 240 is turned on to permit current to tool motor 520. For example, measurements may be acceptable if all cell voltages are above a given voltage level or voltage threshold, such as a given cut-off voltage below which the cell is in an under-voltage condition.

As during charging, the microprocessor 250 monitors cell voltages during discharge of the stack 210. If the trigger switch 510 is released, the voltage at Vin and the regulated voltage (5V) supplied to the microprocessor 250 and IC 220 fade away to ground. With no power supply, the microprocessor 250 shuts down and the Motor Control FET 240 is turned off.

When the trigger switch 510 is pulled again, the IC 220 is powered up and the tool motor 520 operation continues. The tool motor 520 will be enabled as long as the trigger switch 510 is pulled and the cell voltages are greater than a given voltage level or voltage threshold. Once a cell in stack 210 reaches a low voltage threshold such as a cut-off voltage, for example, the microprocessor 250 can command the Motor Control FET 240 to turn off. This action saves the cells of stack 210 from being over-discharged and prolongs cell life.

If the trigger switch 510 is left on (in certain cases some users may tape the trigger on), the microprocessor 250 will continue to direct commands to IC 220 so as to continuously monitor cell voltages, but maintains the Motor Control FET 240 in the off state. Once the total stack voltage has dropped below an example threshold, in this example, this may be 25 volts (because of a small discharge current needed to power the battery circuit), the microprocessor 250 can tell the IC 220 to go into sleep mode via the SLEEP pin 236. This action may substantially reduce power consumption inside the battery pack 300. The IC 220 will stay in this mode until the microprocessor 250 is reset. The battery pack 300 may be eventually removed from the tool 500 and placed back on the shelf in a discharged state.

The above example charge/discharge cycle illustrates how the IC 220 may operate with the microprocessor 250 to prolong cell life. Over-charge protection, over-discharge protection and the ability to perform adaptive cell-balancing within a battery pack during a charge may all be accomplished in a battery pack having an arrangement 200 that includes the IC 220 and microprocessor 250, for example.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

We claim:

1. A battery monitoring device of a battery pack configured for powering a cordless power tool, comprising:
   an integrated circuit in the pack and connected to a microprocessor of the pack that is external to the integrated circuit, and connected to each of N battery cells of the pack, the integrated circuit configured to take, singly or sequentially, a sampled reading comprising one of an individual cell voltage or a total pack voltage for all cells in the pack, wherein the sampled reading is filtered in the integrated circuit prior to being read by the microprocessor;
   wherein the integrated circuit include a logic controller in communication via a serial communication interface with the microcontroller and configured to process a given serial data command received from the microprocessor for taking sampled readings from one or more of the N cells, or to direct selective discharging of one or more of the N cells.

2. The device of claim 1, wherein the integrated circuit is further configured to selectively discharge one or more of the N cells as the battery pack is being charged.

3. The device of claim 2, wherein the microprocessor issues commands to sequentially and periodically measure individual cell voltages and total pack voltage, compare the measured individual cell voltage values received from the integrated circuit to a given threshold as the pack is being charged, and selectively discharge those cells not satisfying the threshold.

4. The device of claim 3, wherein the threshold is an average cell voltage value for all cells that is determined from the total pack voltage measured by the integrated circuit, the average cell voltage value being stored and updated over the duration of charge in the microprocessor.

5. The device of claim 4, wherein the cell having a maximum differential voltage above the average cell voltage is discharged during the charge until its measured cell voltage has dropped to equal the average cell voltage.

6. The device of claim 4, wherein any cells exceeding the average cell voltage are discharged during the charge until their respective measured cell voltage has dropped to equal the average cell voltage.

7. The device of claim 3, wherein the threshold is set as the highest voltage cell measured in a given cycle of measurements, and the microprocessor issues a command to the integrated circuit to discharge the highest voltage cell as evident from the given cycle of measurements.

8. The device of claim 3, wherein the threshold is set as the X highest voltage cells as measured in a given cycle of measurements, and the microprocessor issues a command to the integrated circuit to discharge the X highest voltage cells until these cells measured voltages evident from the given cycle of measurements.

9. The device of claim 3, wherein the threshold is an integer Y ($Y \geq 1$) multiplied by a minimum voltage for the cell that is set in advance, and the microprocessor issues a command to the integrated circuit to discharge those cells exceeding Y*preset minimum voltage.

10. The device of claim 1, wherein N is greater than or equal to 5.

11. The device of claim 1, wherein
the integrated circuit is operatively connected to a corresponding channel of each cell in the battery pack, each channel having a channel input from its cell to the integrated circuit, and
the integrated circuit further includes gate drive circuitry in communication with the logic controller for controlling one or more of a plurality of field-effect transistors (FETs), each FET corresponding to a given channel and operable to selectively discharge its corresponding cell, based on a given data command received from the microprocessor.

12. The device of claim 1, wherein
the integrated circuit is operatively connected to a corresponding channel of each cell in the battery pack, each channel having a channel input from its cell to the integrated circuit, and the integrated circuit further includes;
a switch matrix connected to each of the channels and in communication with the logic controller, and which is adapted to select given channels to output the sampled reading based on a control signal from the logic controller, and
a capacitor connected to the output of the switch matrix for storing the sampled reading, wherein the sampled reading is digitally filtered as the capacitor is being charged so that an average voltage value is stored in the capacitor, and wherein, after a controlled delay to allow the capacitor to charge, the average voltage value stored on the capacitor is output from the integrated circuit for reading by the microprocessor.

13. The device of claim 12, wherein, based on a data command received for measuring a given cell voltage or a total pack voltage, the logic controller sends control signals to close the switch matrix and select given channels for taking the sampled reading, and to align switch positions for a group of switches such that the capacitor becomes part of an RC filtering circuit at the output of the switch matrix to filter the output as the capacitor charges up with the sampled reading.

14. The device of claim 12, wherein the integrated circuit further includes an auxiliary circuit thereon that is connected to the output of the switch matrix for connection to an external differential amplifier, wherein the external amplifier can be selectively connected to the switch matrix output to provide an alternative to the capacitor for taking sampled readings.

15. The device of claim 1, wherein the cells of the battery pack have a lithium-ion cell chemistry.

16. The device of claim 1, wherein a nominal voltage rating of the battery pack is at least 18V.

17. A method of monitoring battery cells of a battery pack that is configured for powering a cordless power tool, comprising:
receiving a first serial data command from a microprocessor of the pack to take a voltage measurement from channels connected to one or more of the cells, the voltage measurement embodied as a differential voltage value measured across an individual cell or a differential voltage value measured across all cells to reflect a total pack voltage,
storing the voltage measurement in a capacitor, wherein the voltage measurement is filtered so that the capacitor charges up to an average of the differential voltage value for a given cell or across all cells of the pack, and
receiving a second serial data command to connect the capacitor to a buffer amplifier so that the microprocessor can read the average voltage value off the capacitor.

* * * * *

UNITED STATES PATENT AND TRADEMARK OFFICE
CERTIFICATE OF CORRECTION

PATENT NO. : 7,417,405 B2  Page 1 of 1
APPLICATION NO. : 11/239286
DATED : August 26, 2008
INVENTOR(S) : David A. Carrier et al.

It is certified that error appears in the above-identified patent and that said Letters Patent is hereby corrected as shown below:

<u>Title Page</u>, Item [75] Inventors,
Line 2, "Dahn T. Trinh" should be -- Danh T. Trinh --.
Line 6, add the following: -- John C. Vanko, Timonium, MD (US); Robert Bradus, Bel Air, MD (US) --.

Signed and Sealed this

Tenth Day of November, 2009

David J. Kappos
*Director of the United States Patent and Trademark Office*